United States Patent [19]
Ota et al.

[11] Patent Number: 5,398,299
[45] Date of Patent: Mar. 14, 1995

[54] MIN-MAX COMPUTING CIRCUIT FOR FUZZY INFERENCE

[75] Inventors: Ken Ota, Yokohama, Japan; William C. Archibald, Austin, Tex.

[73] Assignee: Motorola, Inc., Schaumburg, Ill.

[21] Appl. No.: 126,868

[22] Filed: Sep. 27, 1993

[30] Foreign Application Priority Data

Sep. 29, 1992 [JP] Japan ................... 4-283934
Nov. 18, 1992 [JP] Japan ................... 4-332401

[51] Int. Cl.[6] ............................................. G06F 15/18
[52] U.S. Cl. ........................................ 395/3; 395/900
[58] Field of Search ............................... 395/3, 51, 900

[56] References Cited

U.S. PATENT DOCUMENTS

| 4,837,725 | 6/1989 | Yamakawa | 395/3 |
| 4,875,184 | 10/1989 | Yamakawa | 395/3 |
| 5,073,863 | 12/1991 | Zhang | 395/3 |

OTHER PUBLICATIONS

VLSI Fuzzy Chip and Inference Accelerator Board Systems Hiroyuki Watanabe et al. Aug. 31, 1991 IEEE/1991.

Primary Examiner—Allen R. MacDonald
Assistant Examiner—Richemond Dorvil
Attorney, Agent, or Firm—Elizabeth A. Apperley

[57] ABSTRACT

In a fuzzy inference system comprising a plurality of fuzzy rules including input labels as antecedents, a min-max computing circuit for executing min-max computation on input label grades is disclosed. The min-max computing circuit comprises an input label sorter 10 for sorting all input label grades in their magnitude order; and min-max computing logic devices 30, 40 for executing min-max computations on the input label grades according to the grade's magnitude order.

4 Claims, 9 Drawing Sheets

| | 0.9 | 0.7 | 0.65 | 0.62 | 0.55 | 0.45 | 0.2 | 0.06 | 0.0 | |
|---|---|---|---|---|---|---|---|---|---|---|
| RULE (1) | if | | | | | | | B and | Ⓐ | then X |
| RULE (2) | if | C | | | and | | | Ⓑ | | then X |
| RULE (3) | if | | E | | and | | | Ⓕ | | then X |
| RULE (4) | if | | | | | G and M | and | Ⓝ | | then X |
| RULE (5) | if | | C | and | | | | | | then Y |
| RULE (6) | if | H | | | and | | | Ⓘ | | then Z |
| RULE (7) | if | | | L | | and | | Ⓙ and | Ⓚ | then Z |

*FIG. 6*

ENCODED RULE (1)

| A | B | C | D | E | F | G | H | I | J | K | L | M | N |
|---|---|---|---|---|---|---|---|---|---|---|---|---|---|
| 1 | 1 | 0 | 0 | 0 | 0 | 0 | 0 | 0 | 0 | 0 | 0 | 0 | 0 |

*FIG. 7*

ENCODED RULE (5)

| A | B | C | D | E | F | G | H | I | J | K | L | M | N |
|---|---|---|---|---|---|---|---|---|---|---|---|---|---|
| 0 | 0 | 1 | 1 | 0 | 0 | 0 | 0 | 0 | 0 | 0 | 0 | 0 | 0 |

*FIG. 8*

| INPUT LABEL | A | B | C | D | E | F | G | H | I | J | K | L | M | N | OUTPUT LABEL |
|---|---|---|---|---|---|---|---|---|---|---|---|---|---|---|---|
| CODE | a | b | c | d | e | f | g | h | i | j | k | l | m | n | |
| ENCODED RULE (7) | 0 | 0 | 0 | 0 | 0 | 0 | 0 | 0 | 0 | 0 | 0 | 0 | 0 | 0 | Z |
| (6) | 0 | 0 | 0 | 0 | 0 | 0 | 0 | 1 | 1 | 0 | 0 | 0 | 0 | 0 | Z |
| (5) | 0 | 0 | 0 | 0 | 0 | 0 | 0 | 0 | 0 | 1 | 1 | 1 | 0 | 0 | Z |
| (4) | 0 | 0 | 0 | 1 | 0 | 0 | 1 | 0 | 0 | 0 | 0 | 0 | 0 | 1 | Y |
| (3) | 0 | 0 | 0 | 0 | 1 | 0 | 0 | 0 | 0 | 0 | 0 | 0 | 0 | 0 | X |
| (2) | 0 | 1 | 1 | 0 | 0 | 0 | 0 | 0 | 0 | 0 | 0 | 0 | 0 | 0 | X |
| (1) | 1 | 1 | 0 | 0 | 0 | 0 | 0 | 0 | 0 | 0 | 0 | 0 | 0 | 0 | X |
| | \} RULE ASSOCIATIVE BIT GROUP | | | | | | | | | | | | | | |

*FIG. 9*

| INPUT LABEL | H | C | E | L | D | G | M | B | I | F | K | A | N | J | OUTPUT LABEL |
|---|---|---|---|---|---|---|---|---|---|---|---|---|---|---|---|
| CODE | h | c | e | l | d | g | m | b | i | f | k | a | n | j | |
| GRADE | .9 | .7 | .65 | .62 | .55 | .45 | .2 | .06 | 0 | 0 | 0 | 0 | 0 | 0 | |
| ENCODED RULE (7) | 1 | 1 | 1 | 1 | 1 | 1 | 1 | 1 | 1 | 1 | 1 | 1 | 1 | ① | Z |
| (6) | 1 | 1 | 1 | 1 | 1 | 1 | 1 | ① | 1 | 1 | 1 | 1 | 1 | 1 | Z |
| (5) | 1 | 1 | 1 | ① | 0 | 0 | 0 | 0 | 0 | 0 | 0 | 0 | 0 | 0 | Y |
| (4) | 1 | 1 | 1 | 1 | 1 | 1 | 1 | 0 | 0 | 0 | 0 | 0 | 0 | 0 | |
| (3) | 0 | 0 | 0 | 1 | 1 | 1 | 1 | 0 | 0 | 0 | ① | 0 | 0 | 0 | X |
| (2) | 1 | 1 | 1 | 1 | 1 | 1 | 1 | ① | 0 | ① | 0 | 0 | 0 | 0 | X |
| (1) | 1 | 1 | 1 | 1 | 1 | 1 | 1 | 1 | 1 | 1 | 1 | ① | 0 | 0 | X |

*FIG. 10*

MIN-MAX COMPUTING CIRCUIT FOR FUZZY INFERENCE

FIELD OF THE INVENTION

The present invention, in general, to a fuzzy inference system which is utilized for controlling various consumer electronics, automobiles and the like. More particularly, the invention relates to a min-max computing circuit used in the fuzzy inference system. Such min-max computing circuit performs min-max operations on grades of input labels generated in the inference system, in order to produce output label grades.

BACKGROUND OF THE INVENTION

It is well known in the art to widely use fuzzy logic control based on fuzzy inference in controlling various consumer electronics, household appliances, automobiles, cameras and the like. In the fuzzy control, in general, if fuzzy conception or fuzzy condition "A" holds well, then control "X" is executed. This proposition is represented by a fuzzy rule "if A then X". More specifically, control "X" is executed in a degree determined by how well a fact indicated by input data conforms to fuzzy conception "A". In this fuzzy rule, A is referred to as "antecedent" and X as "consequent". The degree of conformity of the fact to fuzzy conception A is called "grade". Therefore, it is necessary to calculate such grade with regard to each fuzzy conception. An input label is used for identifying each input fuzzy conception or condition. Accordingly a fuzzy conception is referred to also as an input label. An output label is also used for identify each output fuzzy conception or control included in the consequent of a fuzzy rule. Therefore, an output fuzzy conception is referred to as an output label.

In the fuzzy inference system mentioned above, multiple input channels are provided to receive multiple input data such as velocity, pressure and temperature. And multiple input labels are defined in each of the input channels. The system also has multiple output channels to produce multiple output data such as on/off switch signal and valve control signal. And multiple output labels are also defined in each of the output channels. Therefore the total number of the input label grades, each of which needs computation, becomes significantly large, being equal to the number of input channels times the number of input labels per input channel. Further, as discussed below, min-max computation on the input label grades is necessary for each of the output labels in order to choose the adequate output labels.

The min-max computation on the input label grades will be explained below with reference to the following illustrative example, which includes 7 fuzzy rules.

| Rule (1) | if A and B | then X |
|---|---|---|
| Rule (2) | if B and C | then X |
| Rule (3) | if E and F | then X |
| Rule (4) | if G and M and N | then X |
| Rule (5) | if C and D | then Y |
| Rule (6) | if H and I | then Z |
| Rule (7) | if J and K and L | then Z |

The antecedents of these rules include input labels A through N, and the consequents include output labels X through Z. It is assumed that grades Ag through Ng of the input labels A through N have the following values.

$Ag=0$, $Bg=0.06$, $Cg=0.7$, $Dg=0.55$, $Eg=0.65$, $Fg=0$, $Gg=0.45$, $Hg=0.9$, $Ig=0$, $Jg=0$, $Kg=0$, $Lg=0.62$, $Mg=0.2$, $Ng=0$.

First, instead of AND operation, min computation is performed on each rule, which detects the minimum grade among the grades of the input labels for each rule. For example, the antecedent of rule (1) includes input labels A and B with grades being $Ag=0$ and $Bg=0.66$. Therefore, $Ag(=0)$ is selected as the minimum grade since Ag is smaller than Bg. Similarly, rule (2) selects grade $Bg(=0.06)$ of input label B and rule (3) selects grade $Fg(=0)$ of input label F. The rule (4) selects grade $Ng(=0)$.

Then, instead of OR operation, max computation is performed for each of the output labels, which detects the maximum grade among the previously detected minimum grades of rules which have the same output label as their consequents. For example, regarding rules (1), (2), (3) and (4) all having the same output label X, grade $Bg(=0.06)$ is selected as the maximum grade among minimum grades Ag, Bg, Fg and Ng. Similar max computations are performed for other output labels Y and Z, choosing grade $Dg(=0.55)$ for output label Y and $Ig=Jg=Kg=0$ for Z respectively.

Prior art fuzzy control systems have been used mainly in low speed control applications such as home appliances. However, when fuzzy control systems are desired to be used in high speed and relatively complicated control applications such as cruise controls or suspension control of vehicles and the like, computing speed should be significantly improved to typically 1000 times faster than the conventional one. The improvement of the computation speed is achieved by synergistically tuning three computation stages: the grade calculations of input labels, the min-max operations performed on the input label grades to obtain output label grades, and the calculations of center of gravity of output label's membership functions.

Conventional min operations on input label grades have been carried out by comparing each of input label grades with all other input label grades one by one. A typical example of such comparison is Japanese patent laid-open 4-10133 describing comparison achieved by software program. These comparisons by software, however, have difficulty in improving their computing speed because of a large number of magnitude comparisons. Another typical example of comparison achieved by hardware is Japanese patent laid-open 2-159628. This type of solution also has difficulty in improving its execution speed because of a large number of comparison circuits needed for respective input labels, and manufacturing cost reduction is also difficult.

In a typical fuzzy inference system comprising input channels including a plurality of input labels, most of input label grades are zeros. For example, if every membership function crosses only to neighboring functions in each of input channels, then at most two non-zero grades are outputted from each input channel. This means 70-80% of the input label grades on which the min-max operation is performed are zeros. The zero grade, occupying most of input labels, has peculiarity in a sense that it does not contribute to the results of the min-max operations. However, in prior min-max operations, the zero grades were processed in the same manner as non-zero grades. Thus many redundant operations were executed resulting in slow operation speed and large hardware size.

SUMMARY OF THE INVENTION

Accordingly, it is an object of the present invention is to provide an improved min-max computing circuit for fuzzy inference system.

More particularly, it is an object of the present invention to provide such an improved min-max computing circuit with both fast computation speed and reduced hardware size.

These and other objects and advantages of the present invention are provided by a min-max computing circuit in a fuzzy inference system comprising a plurality of fuzzy rules including input labels as antecedents, said min-max computing circuit executing min-max computation on input label grades and comprising: decision circuit for judging magnitude relationships of all input label grades; and computing circuit for executing min-max computations on the input label grades according to the grade's magnitude order judged by said decision circuit.

According to another feature of the invention, there is provided a min-max computing circuit in a fuzzy inference system comprising a plurality of fuzzy rules including input labels as antecedents and output labels as consequents, said min-max computing circuit executing min-max computation on input label grades and comprising: a rule memory for storing encoded rules, each of said encoded rules comprising a plurality of valid/invalid bits, each of which representing whether or not corresponding input label is included in the antecedent of said each of rules; input label sorting circuit for sorting the input labels and the grades thereof according to grade's magnitude order, and providing said rule memory with the sorted input labels in the grade's magnitude order to read out bit streams relevant to each of the provided input labels in the grade's magnitude order; minimum grade detection circuit for detecting the minimum grade for each of the rules based on the first or last appearing valid bit in each of said encoded rules which are read out from said rule memory according to the grade's magnitude order; and maximum grade detection circuit for detecting the maximum grade for each of the output labels, out of a group of the detected minimum grades relevant to said each of the output labels.

These and other objects and advantages of the present invention will be apparent from the detailed description below taken together with the drawings.

DETAILED DESCRIPTION OF THE INVENTION

To facilitate understanding the present invention, the outline of a min-max computation according to the invention will be described first.

According to the present invention, an input label sorter sorts input labels in magnitude order of their grades. For example, 14 input labels A through N, which are included in the seven rules illustrated above and may have been alphabetically arranged originally, can be rearranged or sorted in magnitude order of their grades as shown in FIG. 6.

After the input labels are sorted according to their grade magnitudes, the input label at the right most in each rule has the minimum grade (marked with a circle). Among the marked minimum labels relevant to the same output label, the input label at the left most has the maximum grades (marked with double circles). In this manner, the sorting facilitates the min-max computing.

Figure 6:
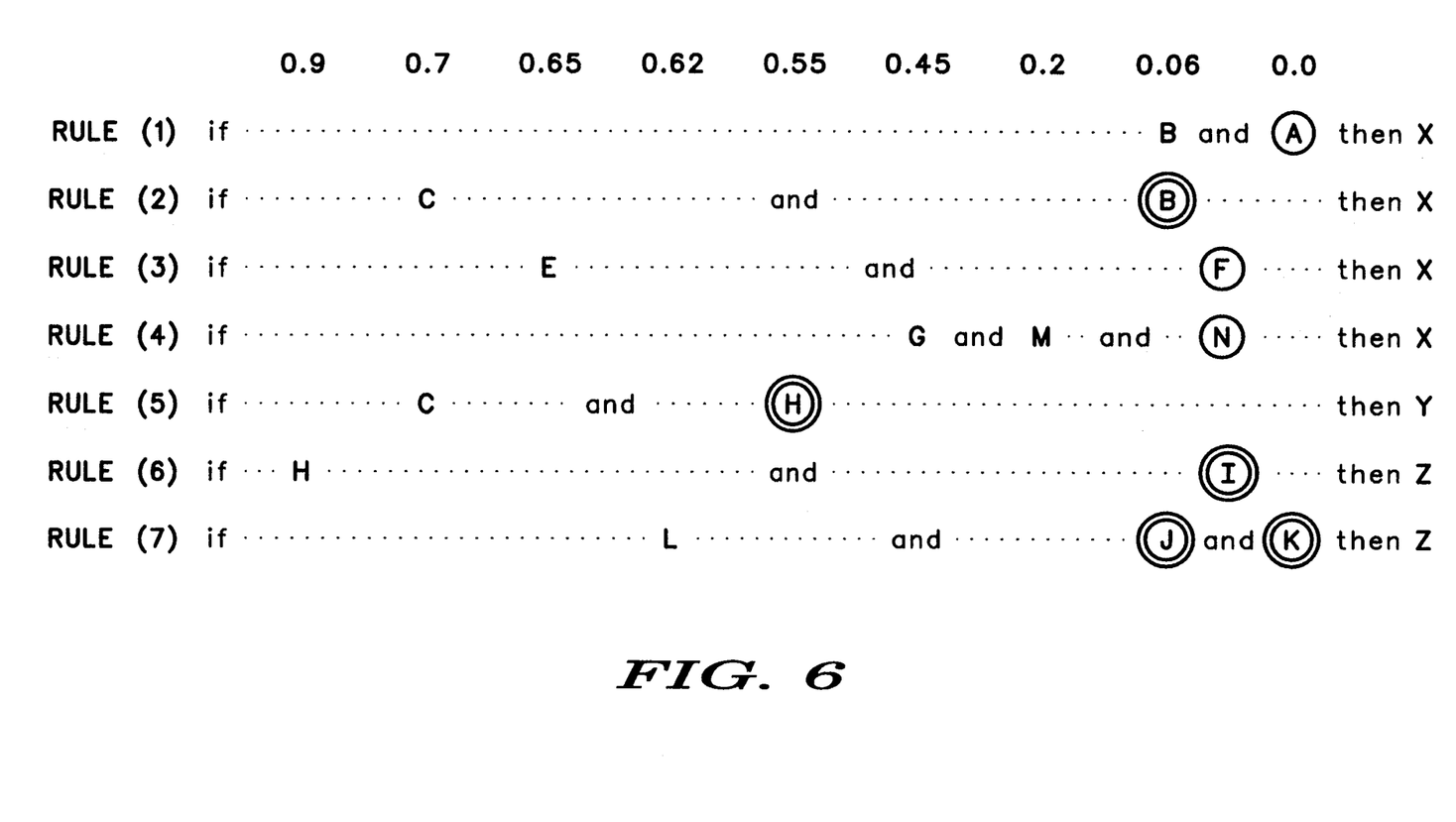
FIG. 6 is a chart illustrating input labels included in antecedents of fuzzy rules.
Figure 7:
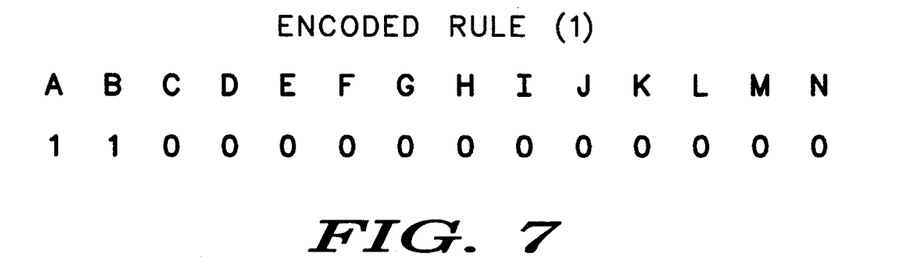
FIG. 7 is a chart illustrating an encoded rule (1) according to the preferred embodiment of the present invention.
Figure 8:
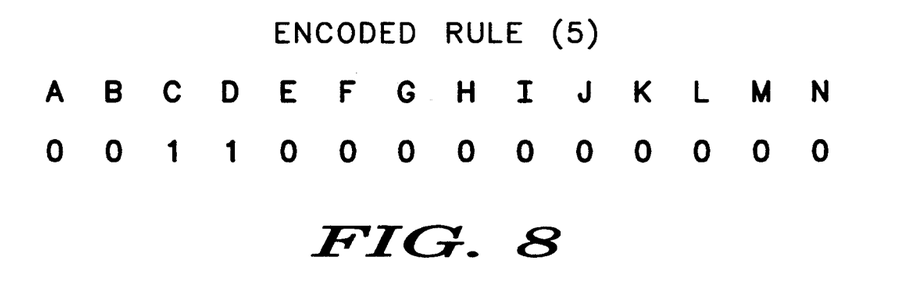
FIG. 8 is a chart illustrating an encoded rule (5) according to the preferred embodiment of the present invention.

In order to achieve sorting function and min-max detecting function as shown in FIG. 6, the present invention prepares a plurality of encoded rules each defined for respective fuzzy rule. The encoded rule for each rule comprises valid/invalid bit array and represents which input labels are included in respective rule, as shown in FIG. 7. The input labels are alphabetically ordered in every rule. A valid bit "1" means that its associated input label (for example, label "A") is included in a rule (1). An invalid bit "0" means that its associated label ("C") is not included in rule (1). It is understood from the valid/invalid bit array shown in FIG. 7 that the only input labels A and B are included in the antecedent of rule (1). Similarly the bit array in FIG. 8 represents that the only labels C and D are included in antecedent of rule (5).

Figure 9:
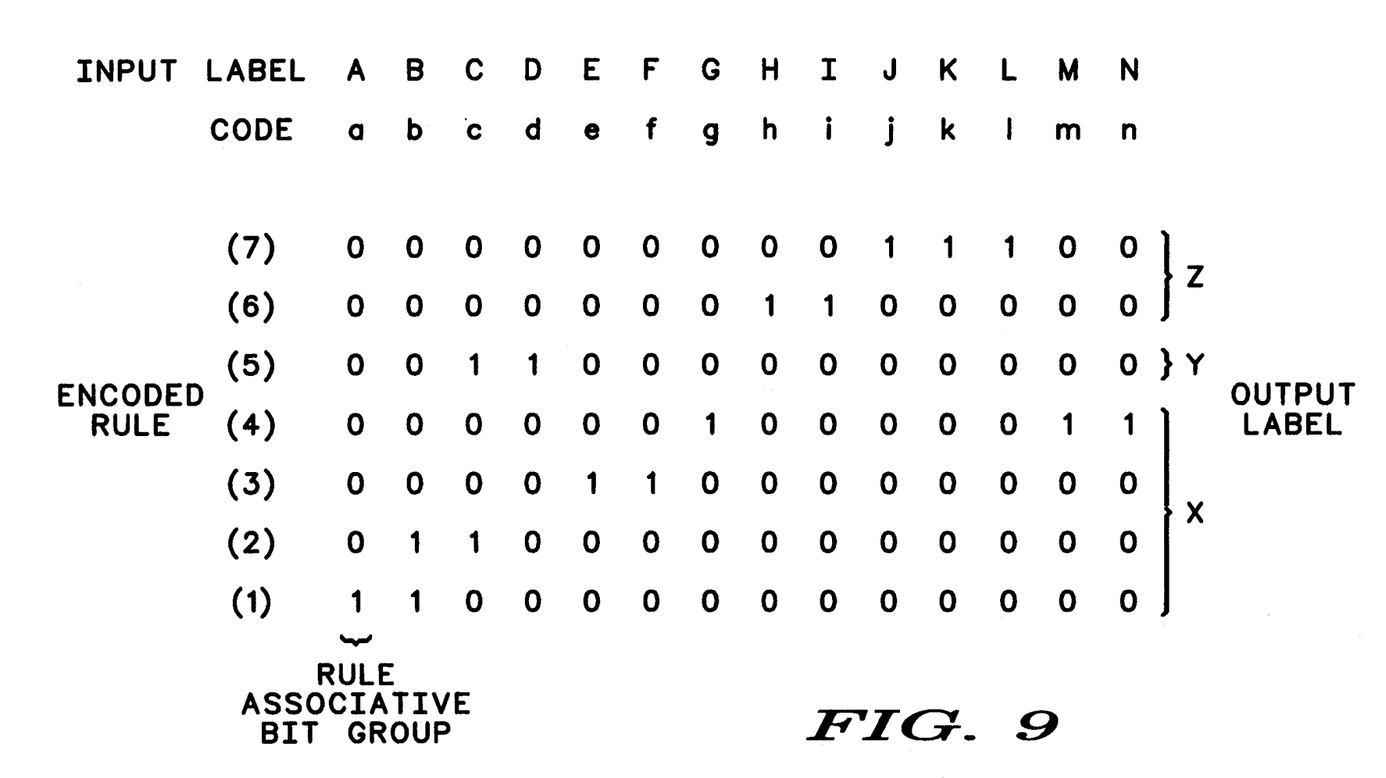
FIG. 9 is a chart illustrating encoded rules comprising valid/invalid bits stored in a rule memory 20 shown in FIG. 1.

Then, two dimensional arrays of the valid/invalid bits shown in FIG. 9 can be obtained by arranging all encoded rules, preferably placing them with the same output labels coming adjacently. In this manner, a bit matrix is obtained, each row bit stream of which represents which input labels are included in a rule associated with the row, and each column bit stream of which represents which output labels are relating to an input label associated with the column.

Each of the column bit stream is referred to as a "rule-associative-bit-group" of respective input label. For example, the rule-associative-bit-group of label A shown in FIG. 9 is "1000000" and label N's is "0001000". These rule-associative-bit-groups are stored in a storage device, preferably a ROM memory, with using associated input labels as addresses. Therefore, the rule associative-bit-groups can be accessed with identification label codes "a" through "n". Such defined memory is referred to as "rule memory" or "rule ROM" and the input label's identification codes used as read addresses for the rule memory are referred to as "label codes".

Figure 10:
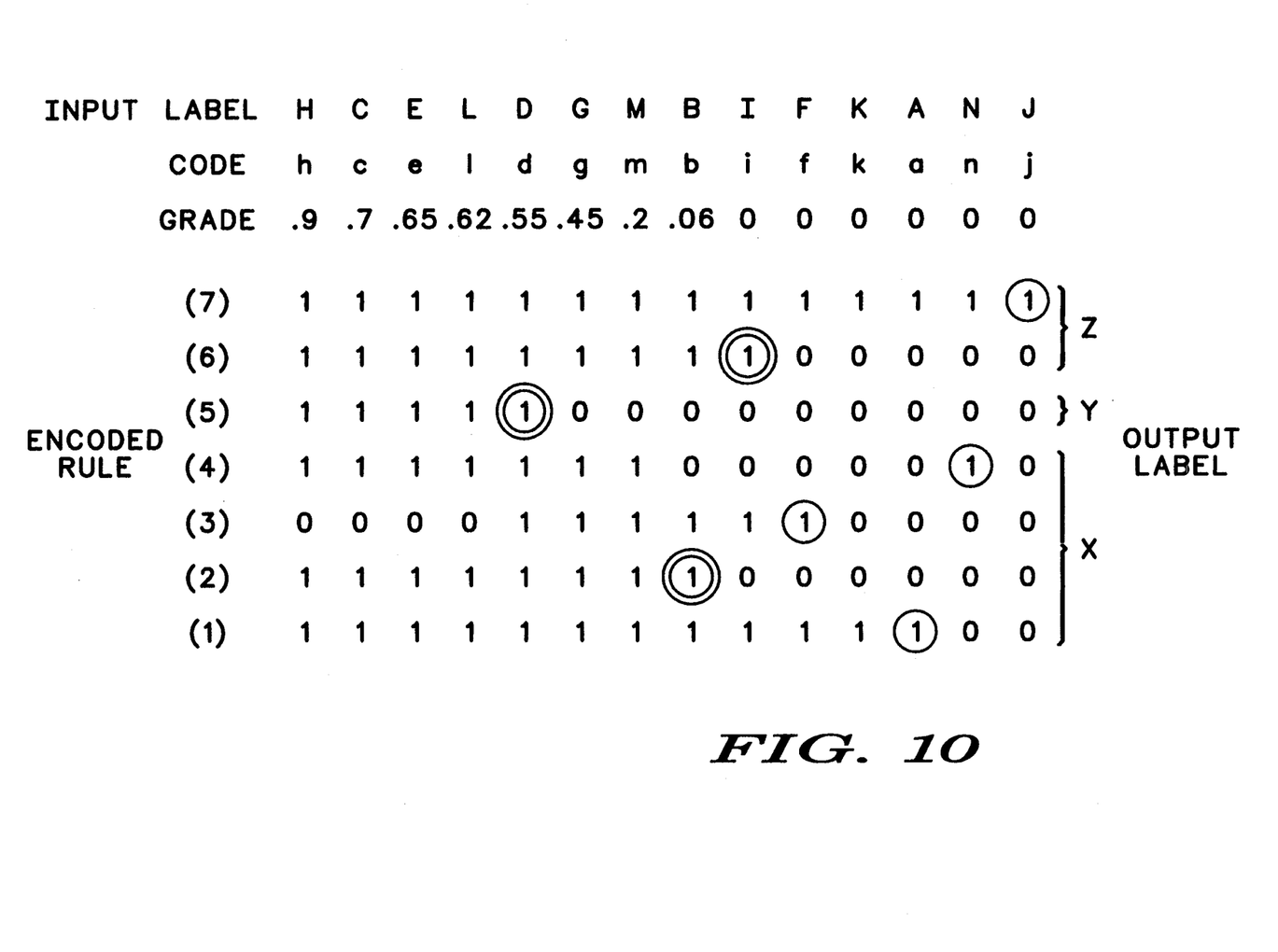
FIG. 10 is a chart illustrating rule-associative-bit-groups sorted in magnitude order of input label grades.

Then the rule-associative-bit-groups shown in FIG. 9 are sorted in magnitude order of their input label grades to get a result shown in FIG. 10. This spatial arrangement in FIG. 10 corresponds to the arrangement in FIG. 6. The sorting from FIG. 9 to FIG. 10 does not affect the fuzzy rules or encoded rules. That is easily understood from an example that rule "if A and B then X" and rule "if B and A then X" are substantially the same.

The right most valid bit ("1") for each encoded rule shown in FIG. 10 can be detected as the minimum grade bit (marked with a circle). Then the left most valid bit can be detected for each output label among the previously detected minimum grade bits. Thus detected left most bit is the maximum grade bit (marked with double circles). Input label grade associated with the maximum grade bit is the min-max computation result to be obtained.

Sorting input labels in magnitude order of grades significantly improves execution time. In prior art min-max computations, comparison is repeatedly performed on every input label in each rule, one by one. If there are 7 rules having input labels A and B, prior art system executes the grade comparison between A and B for each rule, thus the same comparison is repeated 7 times. According to the present invention, only one comparison between A and B is enough even if input labels A and B appear in many rules.

In order to get each of rule-associative-bit-groups sequentially, input label codes are sequentially supplied to the rule memory according to their grade magnitudes' order. A minimum grade detector is provided at each output position of the rule memory. The minimum grade detector finds the minimum grade based on two information: an input label grade (or sort-pointer) supplied from the input label sorter and a valid bit appearing last (or first) in each row bit stream supplied from the rule memory. For example, if the rule memory is accessed in increasing order of the grade magnitudes, the minimum grade detector can detect the first appearing grade with a valid bit as the minimum grade. If the rule memory is accessed in decreasing order of the grade magnitudes, the minimum grade detector can detect the last appearing grade with a valid bit as the minimum grade.

According to the present invention, a maximum grade detector is provided per each of output labels. The maximum grade detector detects the maximum grade out of the detected minimum grades for each relevant rule. The min-max operations according to the invention can be realized by either software or hardware schemes. A typical hardware embodiment is described below in detail.

Figure 1:
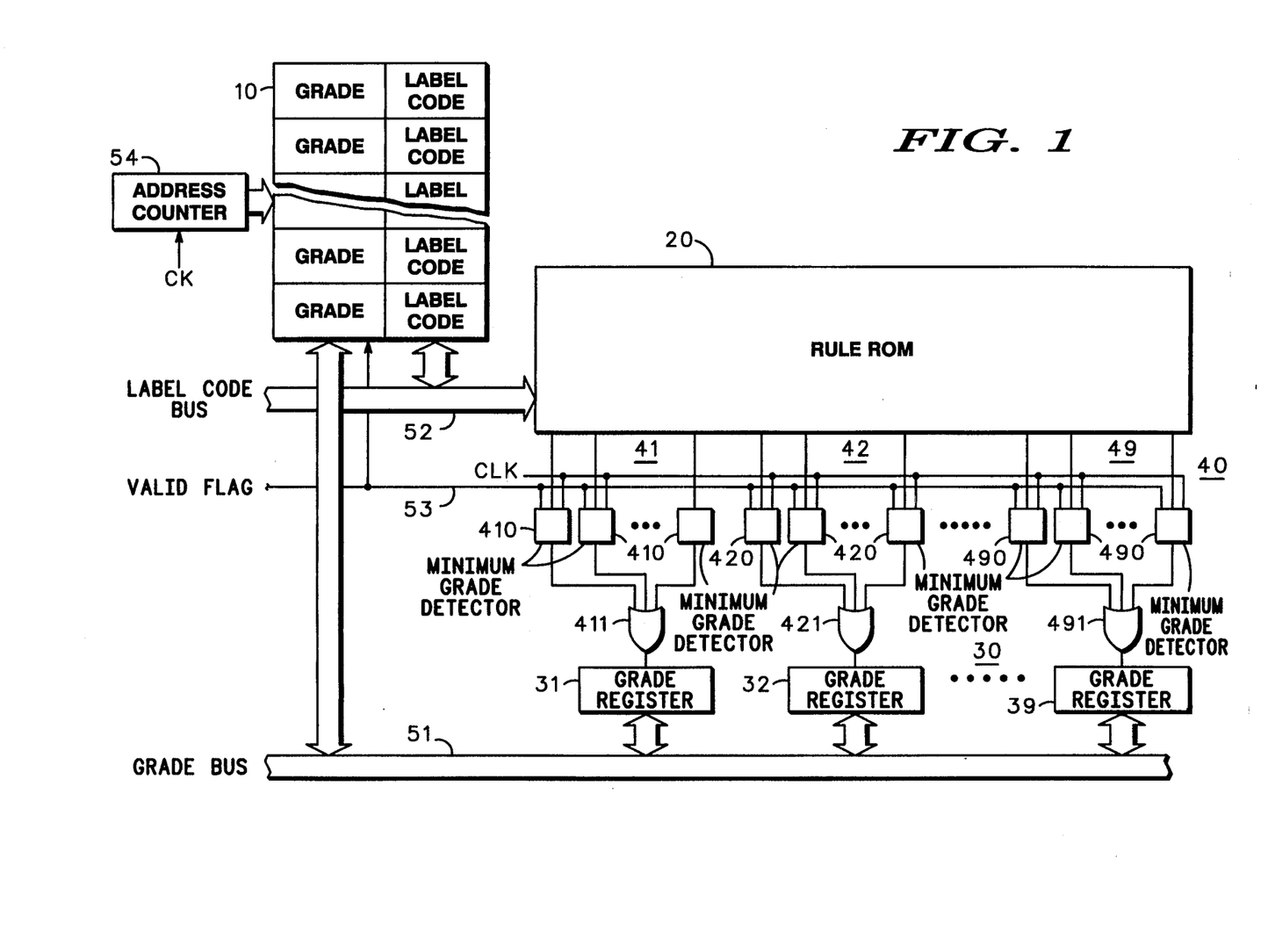
FIG. 1 shows a block diagram of a min-max computing circuit according to a preferred embodiment of the present invention.

FIG. 1 is a block diagram of a min-max operation circuit according to an embodiment of the invention. The circuit includes an input label sorter 10 which sorts input label grades with their label codes according to magnitude order of the input grades. The circuit further includes a rule ROM 20 as a rule memory, a group of grade registers 30 corresponding output labels, a group of logic circuits 40 corresponding to fuzzy rules, a grade bus 51, a label code bus 52 and a valid flag signal line 53. The backend stage comprises rule memory 20, a group of grade registers 30 and a group of logic circuits 40 is illustrated for only one output channel for convenience.

The grade of each input label is calculated by a grade computing circuit (not shown) and supplied onto grade bus 51 in the originally arranged order of the input labels. In a typical system having 3 input channels and 6 input labels in each channel, the total of 18 input label grades appear on grade bus 51. At the same time that an input label grade appears on grade bus 51, its associated input label code appears on label code bus 52.

In a typical fuzzy inference, most of input label grades appearing on grade bus 51 equal zero. For example, if each input channel has 6 input labels and each of the input label membership functions crosses only neighboring membership functions, then at most two non-zero grades are outputted from each input channel. That is, out of total 18 input grades in total 3 channels, at most 6 labels are non-zeros and the remaining 12 grades are equal to zero (referred to as "zero grade"). The min-max detector according to the invention performs exceptional operation on zero grades occupying most of the input label grades to save execution time and reduce hardware size. For this purpose, the grade computing circuit provides a valid/invalid flag onto a valid flag signal line 53. The valid flag indicates non-zero grade, and the invalid flag indicates zero grade.

Figure 5:
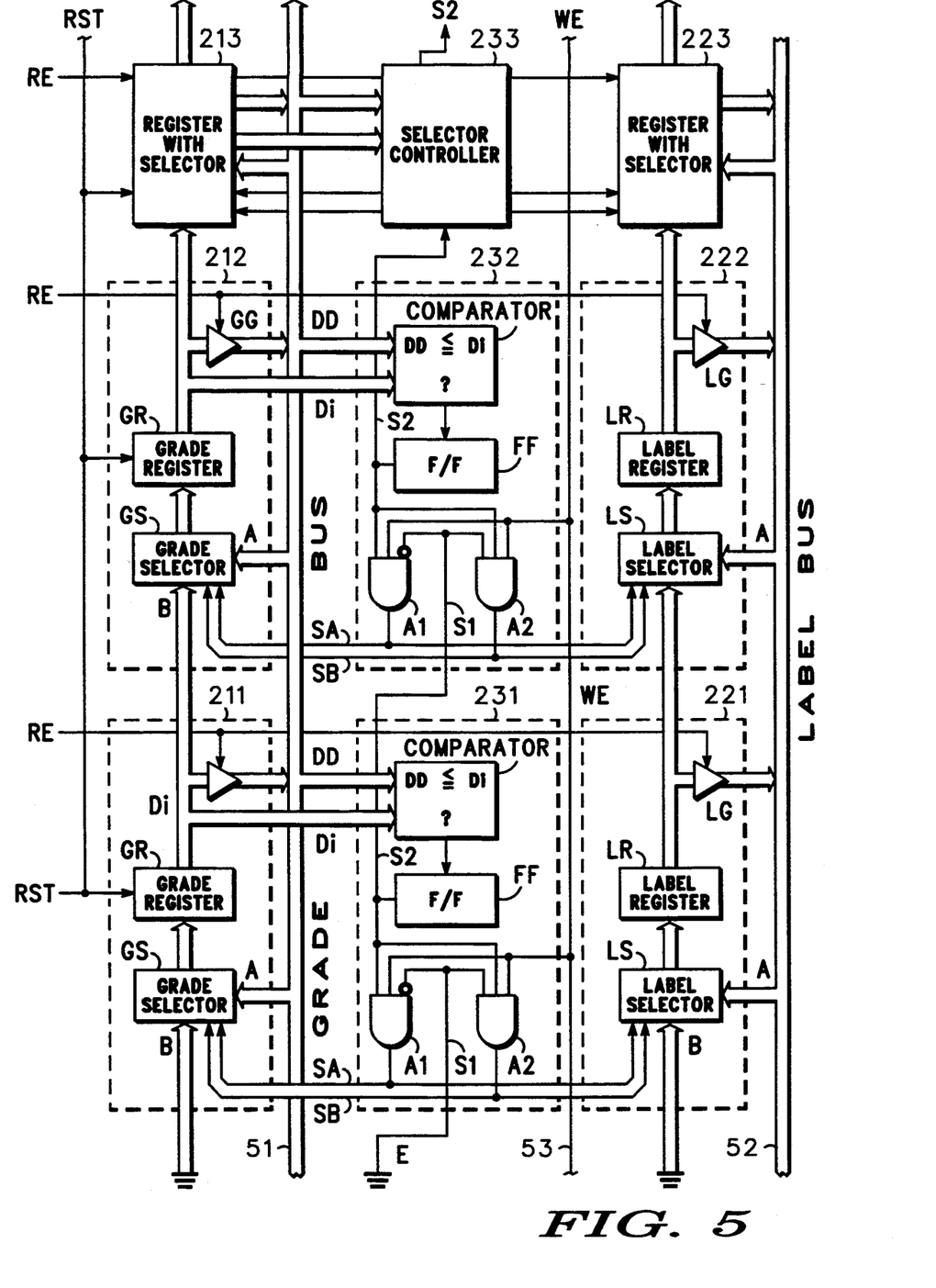
FIG. 5 is a detailed block diagram illustrating an example of the structure of an input label sorter 10 shown in FIG. 1 and FIG. 4.

Input label sorter 10 receives input label grades supplied from grade bus 51, throws away zero grades, and sort non-zero grades in magnitude order of the grades. Input label sorter 10 basically comprises two groups of registers. One group stores input label grades and the other stores corresponding label codes. An example of the structure of input label sorter 10 is shown in FIG. 5.

After input label sorter 10 completes sorting of grades and label codes, every grade resister 31-39 is initialized to zero. Then, according to sequential addresses supplied from address counter 54, the input label grades in input label sorter 10 are outputted in increasing order (from small to large) of their magnitudes onto grade bus 51. Simultaneously associated label codes are outputted from input label sorter 10 onto label code bus 52. Each of the label codes placed on label code bus 52 is fed to the address input terminal of rule ROM 20, to read out a rule-associative-bit-group stored in the memory and supply it to logic circuitry 40.

Logic circuitry 40 consists of, for example, 9 logic sub-circuits 41, 42, ..., 49 corresponding to 9 output labels. Each logic sub-circuit comprises minimum grade detectors 410, 420, ..., 490 respectively and a maximum grade detector 411, 421, ..., 491 respectively. The number of the minimum grade detectors in each logic sub-circuit is equal to the possible largest number of rules relevant to the corresponding output label. Each of maximum grade detector 411, 421, ..., 491 comprises an OR gate producing the logical sum of output signals from each of the minimum detectors.

Minimum grade detector 410 outputs "1" to an input of OR gate 411 only when it detects the first valid bit "1" among bit stream (encoded rule) supplied from rule ROM 20. In other words, even though the second or third valid bit appears in the encoded rule, minimum detector 410 does not output "1". An example of the structure of minimum grade detector 410 is described later.

Upon receiving "1" from OR gate 411, grade register 31 latches current input label grade on grade bus 51. Therefore, each minimum grade detector 410 has a function to cause data register 31 to store the input label grade which is first outputted from input label sorter 10.

Because input labels appear on grade bus 51 in increasing order of their grades, the first input label grade appearing with a valid bit is the targeted minimum grade included in the antecedent of the corresponding rule. Thus each logic sub-circuit 410 performs a function to realize a part of the minimum computation.

Each of grade registers 31, 32, . . . , 32 corresponds to respective output label. Each time when receiving "1" from minimum grade detector, grade register 31 latches current input label grade on grade bus 51 to replace old grade. Thus, when input label sorter 10 completes outputting all label grades contained, grade register 31 holds the minimum input label grade corresponding to minimum grade detector 410 which outputted "1" last. Because each of the input label grades sequentially appears on grade bus 51 in increasing order of the grades, the input label grade stored in grade register 31 is the largest grade among the group of minimum grades relevant to the corresponding output label.

Therefore, each of minimum grade detectors 410 and OR gate 411 perform a part of the min-max computation. The remaining part of the min-max operation is owed to the function of input label sorter 10 to output the smallest grade first onto grade bus 10.

In this manner, when input label sorter 10 completes outputting total 6 of non-zero grades, each grade register holds the input label grade which is a result of the min-max commutation performed on input label grades relevant to the corresponding output channel. The resultant label grades stored in grade registers are transferred through grade bus 51 to the following stage, where defuzzification operation such as the center of gravity calculation method is performed to get final control outputs for each of output channels.

Figure 2:
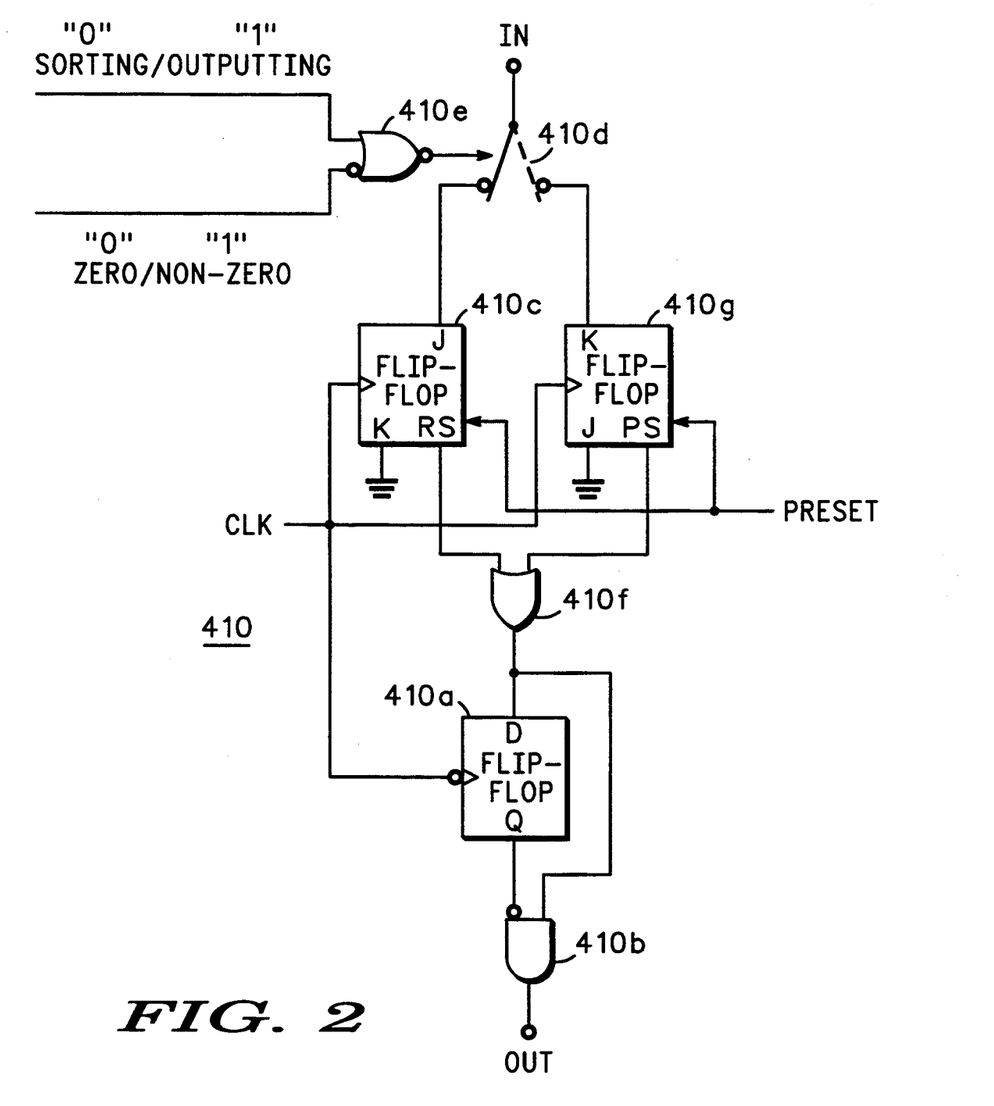
FIG. 2 is a detailed block diagram illustrating the structure of a minimum detector 410 shown in FIG. 1.

Each of the minimum grade detectors, as shown in FIG. 2, comprises a back stage including a D-type flipflop 410a and an AND gate 410b, and a front stage including two J-K flipflops 410c and 410g, a switch circuit 410d and two logic gates 410e and 410f. The main function of the minimum grade detector is, as described above, to share part of the min-max operation performed on sorted input labels. The back stage performs a differential function to output "1" during a half clock period at the transition of "0" to "1" of the output signal of the OR gate 410f. On the other hand, both J-K flipflop 410g and the OR gate 410f inhibit the back stage from performing the differential function on unused rules. Both J-K flipflop 410c and OR gate 410f inhibit the back stage from performing the differential function when any one of three cases occurs: an invalid input label that does not contribute to the corresponding rule appears during sort operation, a valid input label contributing rules has a zero grade, or after the first valid bit has been detected, i.e., the minimum grade has been detected for a rule then further bits should be inhibited.

To one input terminal of NOR gate 410e, a signal is supplied, which indicates that the input label sorter 10 is in either sort operation ("0") or output operation ("1"). The other input terminal of NOR gate 410e receives a signal from valid flag signal line 53, which indicates that current input label's grade to be sorted is either zero ("0") or non-zero ("1").

Before input label sorter 10 initiates its sorting operation on input label grades, a preset signal initializes J-K flipflop 410g to "1" state and J-K flipflop 410c to "0" state. The output of OR gate 410f turns "0". Then input label sorter 10 initiates the sort operation and rule ROM 20 is accessed by label codes appearing on label bus 52 as. During the sort operation, one input terminal of the NOR gate 410e remains "0" as described above.

If the other input terminal of NOR gate 410e receives "1" which indicates that current input label grade appearing on grade bus 51 is a non-zero grade, then NOR gate 410e outputs "1" and the switch turns to the state shown in FIG. 2 by a dotted line. In this state J-K flipflop 410g turns from the initial state "1" to "0" if an input terminal IN receives a valid bit "1" appearing in encoded rule. Then the output of OR gate 410f changes from "1" to "0". On the other hand, if the other input terminal of NOR gate 410e receives "1" indicating a zero grade while input terminal IN is receiving a valid bit "1", then NOR gate 410e outputs "0" causing switch 410d to trip to the state shown in FIG. 2 by a solid line. As a result J-K flipflop 410c trips from the initial state "0" to "1". Then the output of OR gate 410f becomes "1". In this manner, when the sort operation on input label grades is complete, the output of OR gate 410f is "0" if each of input label grades was not zero for each valid bit "1" included in associative encoded rule, otherwise it remains in the initial state "1". That is, the output state "1" of OR gate 410f is provided in either of two cases: any one of input label grades included in encoded rule was zero, or no valid bit "1" appeared in encoded rule.

After input label sorter 10 initiates its output operation of the sorted input label grades together with associative label codes, the input of NOR gate 410e receives "1" and switch 410d trips to the state shown in FIG. 2 by a solid line. The valid/invalid bits of rules read from the rule ROM 20 are fed to J-input terminal of J-K flipflop 410c through switch 410d. If both J-K flipflops 410c and 410g are in the state "0", then Q output of D flipflop 410a remains "0". Therefore a "0" is supplied to the inverting input terminal of AND gate 410b causing it to output "1" during a half clock period through output terminal OUT at the time the valid/invalid bit trips to "1" for the first time. As a result, grade register 31 latches current input label grade on grade bus 51.

On the other hand, if either J-K flipflop 410c or 410g is in the state "1" when the grade sorter 10 initiates its output operation of the sorted input label grades, then the "1" signal on the inverting input terminal of AND gate 410b keeps output terminal OUT as "0". That is, the latching of input label grade is inhibited. In this manner, minimum grade detector 410 is inhibited from performing the min computation in either one of two cases: any one of input label grades included in the antecedent of the corresponding encoded rule was zero or the encoded rule was an unused rule having no input label in its Antecedent. Such inhibiting function is needed due to the following reasons.

For the first reason, although input label sorter 10 throws away zero grade input labels, the principle of the mini-max operation fundamentally does not allow such easy deletion of zero grades. That is, the principle of the mini-max operation requires the same operation even on zero grades as on non-zero grades in order to get zero result from zero grade. The easy deletion of zero grades may causes incorrect results by detecting minimum non-zero grade. To avoid such wrong operation, if a zero grade is deleted, a single bit information is provided to inhibit further executions of minimum operation. By inhibiting further executions of minimum operation, the grade registers maintain the initial state "0", which means zero grades.

For the second reason, if any one of rules included in an output label is never used then it must be excluded from min-max operations. As an identifier for the unused rules, J-K flipflop 410g is added.

Now, at the completion of min-max operations, each of grade registers, for example each of nine grade registers per output channel, holds non-zero grade as a result. These at most nine output label grades per output channel are transferred to the following stage, a defuzzifier, to be used in MAX defuzzification operations. To reduce execution time of the defuzzification operation, each full membership function for output is replaced by corresponding singleton data which consists of a vertical line of unit length standing at the position of corresponding membership function's center of gravity. Each unit length singleton data is cut so as to have the length defined by magnitude of associative output label's grade.

According to Applicant's pending Japanese application "Defuzzification method for fuzzy inference" filed on Oct. 7, 1992 with the filing number of 4-293698 discloses an approximation approach for reducing calculation time. The approximation approach uses only two largest height singleton data for calculating the center of gravity, instead of using all singleton data processed by MAX defuzzification. For this approximation approach, it is very convenient if two largest output label grades are previously selected out of nine grade registers 31 through 39. An example circuit for selecting the largest two output label grades, according to another embodiment of the invention, is shown in FIG. 3.

Figure 3:
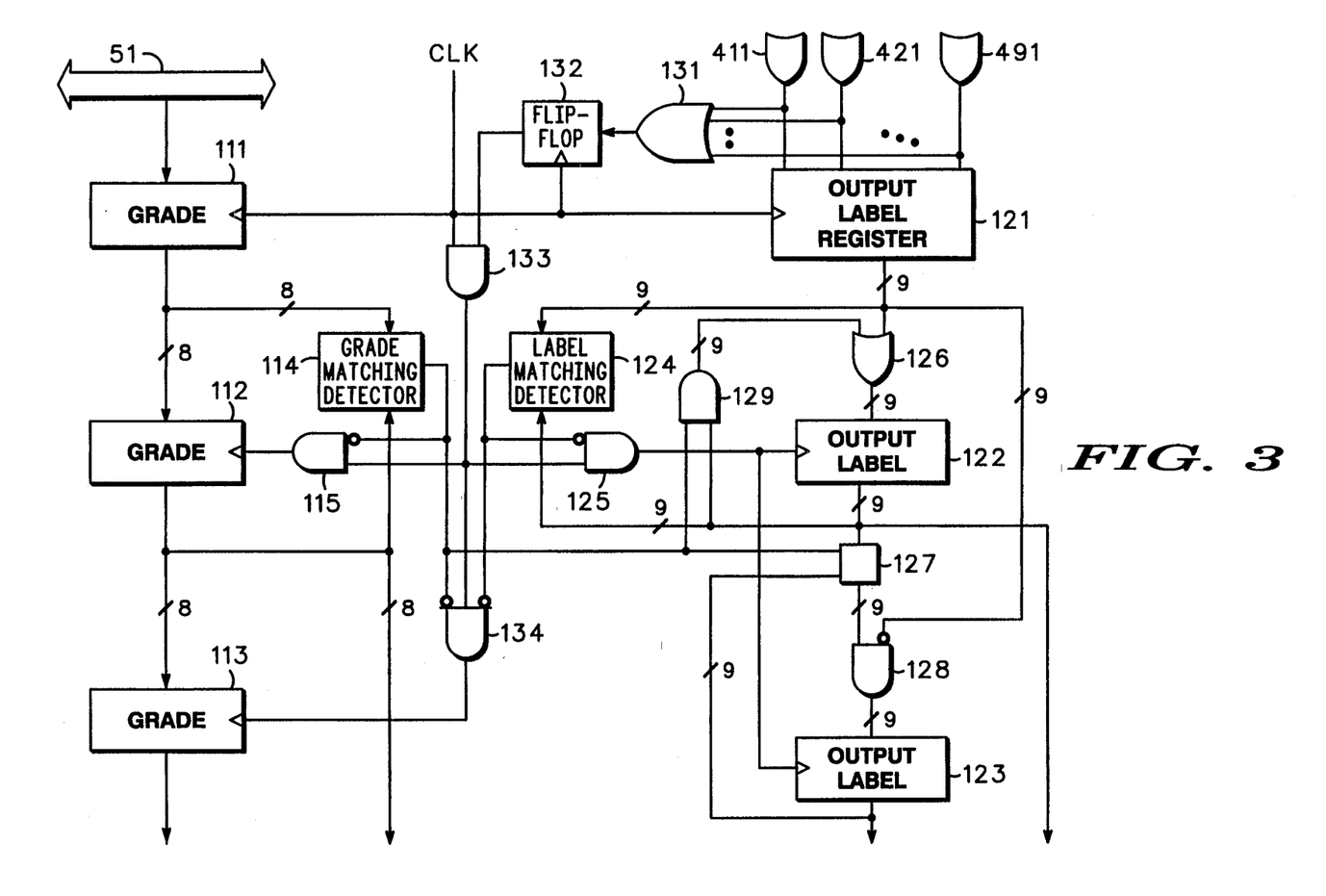
FIG. 3 is a detailed block diagram illustrating another structure of grade registers 31-39 as shown in FIG. 1.

Nine grade registers 31 through 39 of FIG. 1 is replaced with some elements in a selective latch circuit shown in FIG. 3. The same reference numbers are used in FIG. 3 for indicating the same elements as shown in FIG. 1. The selective latch circuit comprises a group of cascaded three grade registers 111 through 113, a group of similarly cascaded three label registers 121 through 123, a grade matching detector 114 which detects matching between two grades stored in each register, a label matching detector 124 which detects matching between two labels stored in each register.

Outputs of OR gates 411 through 491 are directly connected to output label register 121, while logical sum of them is inputted to D-type flipflop 132 through OR gate 131. When any one of OR gates 411 through 491 outputs "1", D-type flipflop 131 is set to "1". Current grade appearing on grade bus 51 is always latched by grade register 111, the outputs of OR gates 411 through 491 is always latched by output label register 121 simultaneously. However, the "output label" used here is different from the input label code code used for accessing the rule memory 20 shown in FIG. 1. The "output label" is the same as a column bit stream read out from rule ROM 20 accessed with current input label code. The bit position of "1" of the output label indicates which output label is relevant to a current grade stored in grade register 111, as clearly seen from FIG. 9.

The grade stored in grade register 111 is compared with the contents of grade register 112 by comparator 114, while the output label stored in label register 121 is compared with the contents of label register 122 by comparator 124.

Case A: The contents of label register 121 does not match the contents of label register 122 (different output label) and the contents of grade register 111 does not match the contents of the grade register 112 (different grade).

The contents of grade register 112 is transferred to grade register 113 and the contents of grade register 111 is transferred to grade register 112. Simultaneously the contents of label register 122 and inverted contents of label register 121 are ANDed then transferred to label register 123 through a switch 127 and an AND gate 128, while the contents of label register 121 is transferred to label register 122 through an OR gate 126.

Case B: The contents of label register 121 does not match the contents of label register 122 (different output label) but the contents of grade register 111 matches the contents of grade register 112 (same grade).

The contents of label register 122 and the inverted contents of label register 121 are ANDed then transferred to label register 123 through switch 127 and AND gate 128, while the contents of label register 121 and the contents of label register 122 are ORed then transferred to label register 122 through an OR gate 126.

Case C: The contents of label register 121 matches the contents of label register 122 (same output label) but the contents of grade register 111 does not match the contents of grade register 112 (different grade).

The contents of grade register 111 is transferred to grade register 112.

Case D: The contents of label register 121 matches the contents of label register 122 (same output label) and the contents of grade register 111 matches the contents of grade register 112 (same grade).

No action takes place in this case.

In Case A, a new largest grade appeared on grade bus 51 is latched into grade register 111 and old largest grade is transferred from grade register 112 to grade register 113 as new next largest grade, while the contents of grade register 111 is transferred to grade register 112 as new largest grade. Accordingly grade register 112 latches the largest grade appeared on grade bus 51 and grade register 113 latches the next largest grade appeared on the grade bus 51. Label registers 122 and 123 latch labels corresponding to the largest and next largest grade respectively. Storing an identical label in both label registers 122 and 123 can be prohibited by ANDing the contents of label registers 122 and the inverted contents of label register 123 then transferring to label register 123. The contents of each register is transferred to a next stage, a defuzzifier, to get final output data.

Figure 4:
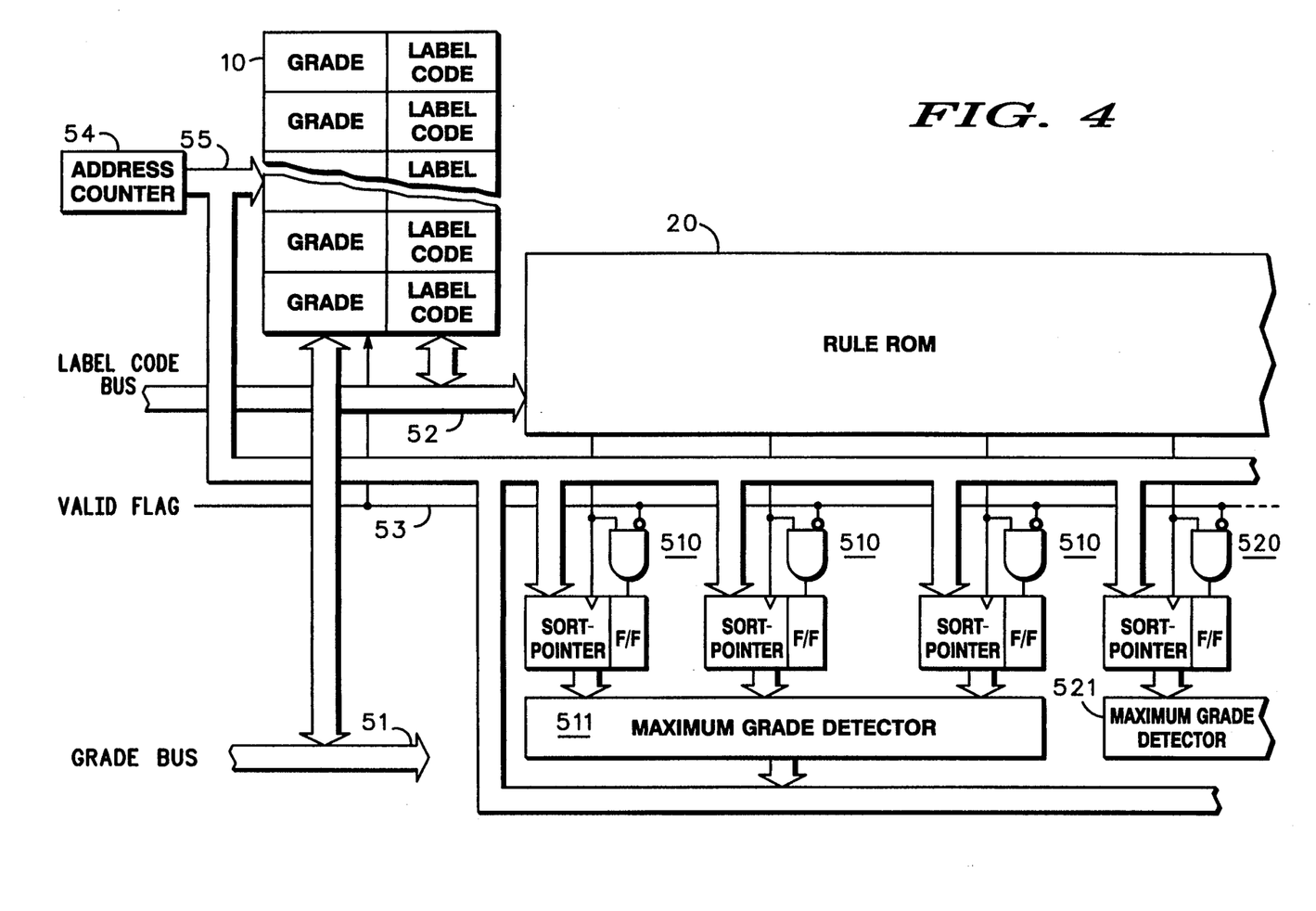
FIG. 4 is a block diagram of a min-max computing circuit according to another embodiment of the present invention.

FIG. 4 shows a block diagram illustrating a fuzzy inference min-max computing circuit according to another embodiment of the invention. Elements shown in FIG. 4 with the same reference numbers as in FIG. 1 are identical to the corresponding elements in FIG. 1, and therefore will not be explained here.

In this embodiment, after input label sorter 10 completes the sorting of input labels, address counter 54 outputs addresses onto address bus 55 in decreasing order (from large to small) of the corresponding grade's magnitude. The position of the sorted input grades in sorter 10 is referred to as particular input label's "sort-pointer". Each of minimum grade detectors 510, 520 corresponding to respective rules in rule memory 20 comprises a register, which latches current sort-pointer from bus 55 whenever it detects a valid bit in rule-associative-bit-group supplied from rule ROM.

As a result, the minimum grade detectors 510 latches last a sort-pointer corresponding to the minimum grade, which appears with the last valid bit. Each of maximum grade detectors 511, 521 corresponding to output labels comprises a register, which selects and latches the maximum pointer among the minimum sort-pointers which have been stored in the minimum detectors 510, 520.

After input label sorter 10 completes its output operation, the sort-pointers stored in group of the maximum grade detectors 511, 521 are outputted sequentially onto bus 55 as read addresses for input label sorter 10. As a result, adequate input label grades are outputted on grade bus 51 as the results of min-max operations for output labels.

Both an AND gate and a flipflop attached to each of minimum detectors 510, 520 are added for exceptional processing on zero grades. If a valid zero grade occurs during the rearrangement operation by input label sorter 10, the corresponding AND gate outputs "High" setting following flipflop. Minimum detectors with their flipflops being set are inhibited from latching sort-pointers and is later excluded out of max comparison operation.

FIG. 5 is a detailed block diagram illustrating an input label sorter 10 shown in FIG. 1 and FIG. 4. The structure of the input label sorter is not subject of this application, and therefore is not described in more detail here.

As described above, zero-grades are processed exceptionally to improve the processing speed and to reduce hardware size. However, a threshold value greater than zero can be used to exceptionally process the grades which are less than the threshold value. The embodiment in FIG. 4 shows that sort-pointers (entry addresses) are outputted in decreasing order of grade magnitude. However, another apparent modification might be included in this invention. For example, input label sorter 10 may output input label grades themselves in decreasing order of their magnitude. Then each of the maximum grade detectors 511, 521, can detects the maximum grade from the group of minimum grades. In the embodiment shown in FIG. 1 each maximum grade detector having multiple logic circuits 40 is provided corresponding to each of output channels. However, an alternative architecture might be used where single logic circuit and/or single maximum grade detector can be used in time-sharing manner for multiple output labels/channels to reduce hardware size.

We claim:

1. In a fuzzy inference system comprising a plurality of fuzzy rules, a plurality of input labels and a plurality of output labels, each of the fuzzy rules including a subset of the input labels as antecedents and one of the output labels as a consequent, a min-max computing circuit for executing a min-max computation on input label grades, comprising:

a) rule memory means for storing a plurality of digital values, each of the digital values corresponds to one of the plurality of fuzzy rules and each of the digital values comprises an ordered plurality of digital bits, each of the digital bits of each of the digital values corresponds to one of the plurality of input labels, the ordered plurality of digital bits of each of the digital values is arranged so that an Nth one of the plurality of input labels corresponds to an Nth bit in each of the plurality of digital values, each of the digital bits of a particular one of the digital values is in a first binary state if the corresponding input label is an antecedent of the fuzzy rule corresponding to that particular one of the digital values, and is in a second binary state if the corresponding input label is not an antecedent of the fuzzy rule corresponding to that particular one of the digital values;

b) an input label sorter circuit comprising:

i) a plurality of storage means, each of the storage means having a first portion for storing a one of a plurality of digital grade values and a second portion for storing a one of a plurality of label codes corresponding to the one of the plurality of digital grade values stored in the first portion, the one of the plurality of label codes identifies one of the plurality of input labels; and ii) sorting means coupled to the plurality of storage means for sorting the plurality of digital grade values and the plurality of label codes within the plurality of storage means according to a magnitude of each of the plurality of digital grade values;

c) first accessing means coupled to the plurality of storage means for sequentially retrieving from the plurality of storage means, in a predetermined order, the plurality of digital grade values and corresponding ones of the plurality of label codes;

d) grade bus means for carrying the plurality of digital grade values retrieved from the plurality of storage means by the first accessing means;

e) second accessing means coupled to receive the plurality of label codes retrieved from the plurality of storage means by the first accessing means and for retrieving from the rule memory means, in response to each of the plurality of label codes, each of the digital bits corresponding to the input label identified by a corresponding one of the plurality of label codes;

f) an output label register coupled to the grade bus means; and g) digital logic means coupled to receive the digital bits retrieved from the rule memory means by the second accessing means for causing the output label register to store the plurality of digital grade values received from the grade bus means at times determined by the values of the digital bits received from the rule memory means so that, after the first accessing means has retrieved all of the plurality of digital grade values and corresponding ones of the plurality of label codes from the plurality of storage means, the output label register will contain a digital grade value corresponding to a min-max computed grade for one of the plurality of output labels.

2. A min-max computing circuit according to claim 1 wherein the input label sorter circuit further comprises:
   means for eliminating from a remainder of a min-max computation a portion of the plurality of digital grade values less than a predetermined threshold value.

3. A min-max computing circuit according to claim 1 wherein the sorting means sorts in descending order and wherein the first accessing means retrieves in ascending order.

4. A min-max computing circuit according to claim 3 wherein the digital logic means further comprises:
   means for causing the output label register to store a second one of the plurality of digital grade values received from the grade bus exactly once for each of the plurality of label codes output by the plurality of storage means, upon a first occurrence of a digital bit received from the rule memory means in the first binary state.

* * * * *